(12) United States Patent
Tricoukes et al.

(10) Patent No.: US 9,503,555 B2
(45) Date of Patent: Nov. 22, 2016

(54) MOUNTING DEVICE COUPLABLE TO A HUMAN HEAD

(75) Inventors: Nicole Tricoukes, Seaford, NY (US); Patrick Riechel, Briarwood, NY (US); Tom Roslak, Northport, NY (US); Jorg Schlieffers, Theale Reading (GB)

(73) Assignee: Symbol Technologies, LLC, Holtsville, NY (US)

( * ) Notice: Subject to any disclaimer, the term of this patent is extended or adjusted under 35 U.S.C. 154(b) by 1005 days.

(21) Appl. No.: 12/603,388

(22) Filed: Oct. 21, 2009

(65) Prior Publication Data

US 2011/0089207 A1  Apr. 21, 2011

(51) Int. Cl.
*H04M 1/05* (2006.01)

(52) U.S. Cl.
CPC ...................... *H04M 1/05* (2013.01)

(58) Field of Classification Search
CPC ....................................................... H04M 1/05
USPC ............................. 224/181; 2/209.13; 345/8
See application file for complete search history.

(56) References Cited

U.S. PATENT DOCUMENTS

| | | | |
|---|---|---|---|
| RE30,662 E | 6/1981 | Foley | |
| 5,003,300 A * | 3/1991 | Wells | 345/8 |
| 5,696,521 A | 12/1997 | Robinson et al. | |
| 5,767,820 A * | 6/1998 | Bassett et al. | 345/8 |
| 6,046,712 A * | 4/2000 | Beller et al. | 345/8 |
| 6,181,304 B1 | 1/2001 | Robinson et al. | |
| 6,234,446 B1 * | 5/2001 | Patterson | 248/694 |
| 6,260,987 B1 | 7/2001 | Wu | |
| 6,327,738 B1 | 12/2001 | Lewis | |
| 6,359,602 B1 | 3/2002 | Amafuji et al. | |
| 6,496,161 B1 * | 12/2002 | Tanaka | 345/8 |
| 6,771,424 B1 | 8/2004 | Amafuji et al. | |
| 7,091,928 B2 | 8/2006 | Rajasingham | |
| 7,542,012 B2 | 6/2009 | Kato et al. | |
| 7,956,822 B2 | 6/2011 | Nakabyashi et al. | |
| 8,072,393 B2 | 12/2011 | Riechel | |
| 8,237,627 B2 | 8/2012 | Nakabyashi et al. | |
| 8,289,231 B2 | 10/2012 | Budd et al. | |
| 2002/0122014 A1 * | 9/2002 | Rajasingham | 345/8 |
| 2004/0021619 A1 | 2/2004 | Kiyokawa | |
| 2004/0080467 A1 | 4/2004 | Cjinthammit et al. | |
| 2005/0219152 A1 * | 10/2005 | Budd et al. | 345/8 |
| 2006/0090246 A1 | 5/2006 | Cozens et al. | |
| 2006/0119539 A1 * | 6/2006 | Kato et al. | 345/8 |
| 2006/0132382 A1 | 6/2006 | Jannard | |
| 2006/0238878 A1 | 10/2006 | Miyake et al. | |
| 2007/0013611 A1 * | 1/2007 | Nakabayashi et al. | 345/8 |
| 2007/0223766 A1 | 9/2007 | Davis et al. | |

(Continued)

OTHER PUBLICATIONS

Non Final Office Action mailed Oct. 22, 2013 for related U.S. Appl. No. 12/941,140, Nicole Tricoukes, filed Nov. 8, 2010.

*Primary Examiner* — Corey Skurdal (57) ABSTRACT

A clamping apparatus for a head-mounted display device is provided. The clamping apparatus comprises a pivot portion at a rear of the clamping apparatus, the pivot portion adapted to rotate in a rotation plane, a first side portion coupled to and extending in a forward direction from the pivot portion, a second side portion coupled to and extending in the forward direction from the pivot portion, wherein the pivot portion is adapted to adjust the first and second side portions through the rotation plane to a first position and maintain the first position until later adjusted, and a display device assembly coupled to the first side portion, the display device assembly extending in the forward direction from the first side portion.

19 Claims, 5 Drawing Sheets

(56) References Cited

U.S. PATENT DOCUMENTS

| | | |
|---|---|---|
| 2008/0291277 A1* | 11/2008 | Jacobsen et al. .............. 348/158 |
| 2009/0073083 A1 | 3/2009 | Miyakawa et al. |
| 2009/0117890 A1* | 5/2009 | Jacobsen .............. G02B 27/017 455/419 |
| 2009/0128448 A1* | 5/2009 | Riechel ............................ 345/8 |
| 2009/0128450 A1* | 5/2009 | Nakabayashi et al. ........... 345/8 |
| 2009/0323979 A1* | 12/2009 | Leske et al. .................... 381/72 |
| 2010/0014699 A1 | 1/2010 | Anderson et al. |
| 2010/0073262 A1 | 3/2010 | Masumoto |
| 2010/0188314 A1* | 7/2010 | Miyake et al. ................... 345/8 |
| 2011/0090135 A1 | 4/2011 | Tricoukes et al. |
| 2012/0114131 A1 | 5/2012 | Tricoukes et al. |

* cited by examiner

MOUNTING DEVICE COUPLABLE TO A HUMAN HEAD

TECHNICAL FIELD

Embodiments of the subject matter described herein relate generally to devices for mounting objects to the human body. More particularly, embodiments of the subject matter relate to positioning and retaining a head-mounted device.

BACKGROUND

Portable electronic devices are used in environments where hands-free interaction would be desirable. For example, on construction sites or in warehouses, a user benefits from manipulating objects while still having interaction with an electronic device, such as a mobile computer. Moreover, portable electronic devices typically have compact displays, often measuring only several inches across, or less. Visualizing information on a small display can be limiting both in the total amount of information displayable as well as the increased concentration required by a user to focus on minute graphical images.

Wearable computing devices are sometimes used to allow a user to receive information without the need to carry a separate device. Additionally, such computing devices can include a head-mounted display which presents a screen near the eye of the user. The proximity of the screen to the user's eye, as well as the use of magnifying optics, can result in a screen perceived to be much larger than the actual size of the screen. Because the overall size of the screen appears larger, more information can be displayed at a size easily viewable by the user when a relatively high-resolution screen is used. Such head-mounted displays can be used with non-wearable computing devices as well, with the same benefit.

Head-mounted displays can be cumbersome, heavy, and uncomfortable to wear. Head-mounted displays are typically supported by a bulky, rigid structure passing over the top of the user's head. Such a structure has other drawbacks, including the lack of compatibility with equipment typically used in situations where a head-mounted display is desirable. For example, on a construction site, a user might be required to wear a hard hat or safety glasses. Typical head-mounted displays often inhibit the wearing of such devices.

BRIEF SUMMARY

A clamping apparatus for a head-mounted display device is provided. The clamping apparatus comprises a pivot portion at a rear of the clamping apparatus, the pivot portion adapted to rotate in a rotation plane, a first side portion coupled to and extending in a forward direction from the pivot portion, a second side portion coupled to and extending in the forward direction from the pivot portion, wherein the pivot portion is adapted to adjust the first and second side portions through the rotation plane to a first position and maintain the first position until later adjusted, and a display device assembly coupled to the first side portion, the display device assembly extending in the forward direction from the first side portion.

A wearable computing apparatus is also provided. The wearable computing apparatus comprises a hinge member adapted to rotate with a nominal stiffness in a rotation plane, a first gripping member coupled to the hinge member and extending forward from the first gripping member substantially in the rotation plane, and comprising a processing device, and a second gripping member coupled to the hinge member and extending forward from the hinge member substantially in the rotation plane, the hinge member adapted to rotate the first and second gripping members through the rotation plane and inhibit movement of the first and second gripping members using the nominal stiffness.

A head-mounted display apparatus is also provided. The display apparatus comprises a first side portion having a first front end and a first rear end, the first front end positioned in a forward direction from the first rear end, and a pivot member having a nominal stiffness and adapted to rotate about an axis, the pivot member coupled to the first rear end and configured to adjust the position of the first side portion by rotating about the axis, the pivot member further adapted to inhibit movement of the first side portion using the nominal stiffness.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

Figure 3:
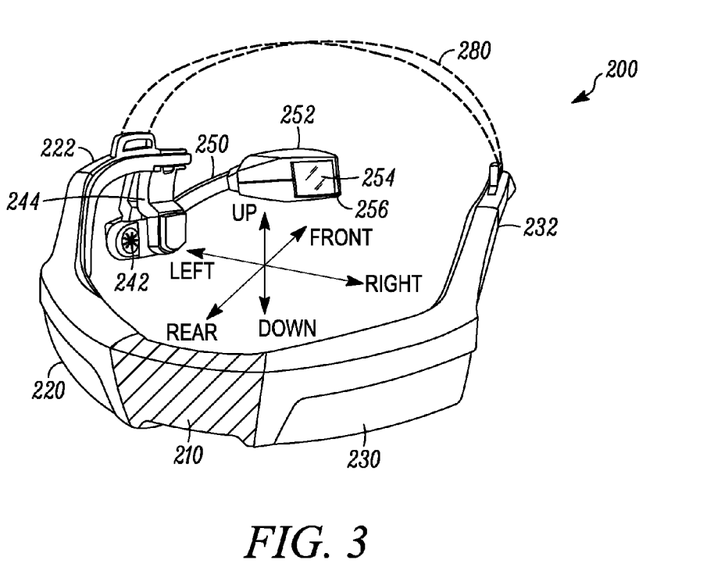
FIG. 3 is a rear perspective view of another embodiment of a head-mounted display assembly.
Figure 4:
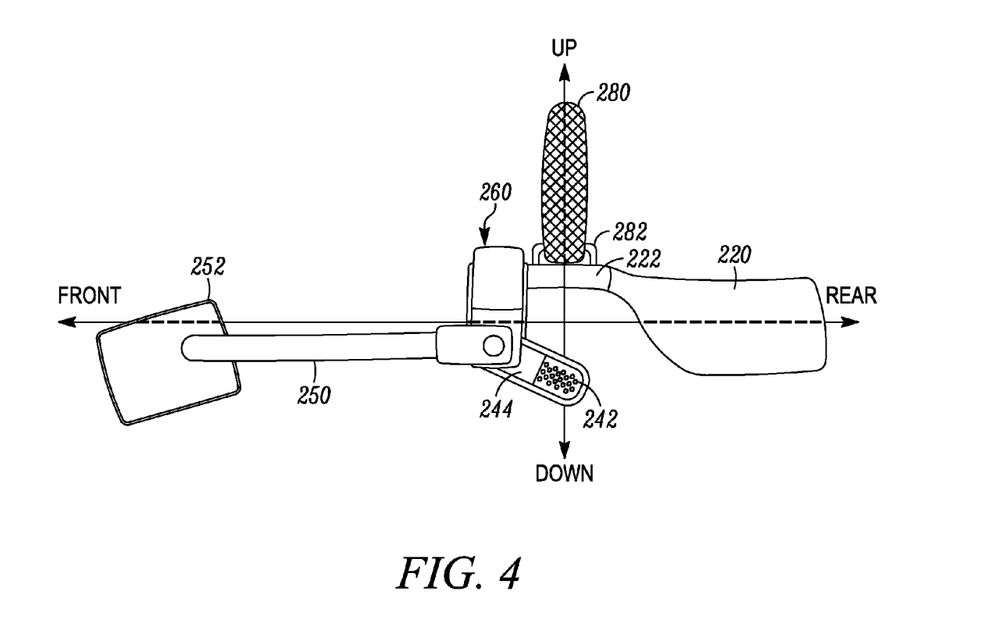
FIG. 4 is a left side view of the display assembly embodiment of FIG. 3.

Thus, although the schematic shown in FIGS. 3 and 4, for example, depict one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. These and other similar terms, such as "front", "back", "rear", "side", and so on, describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Figure 1:
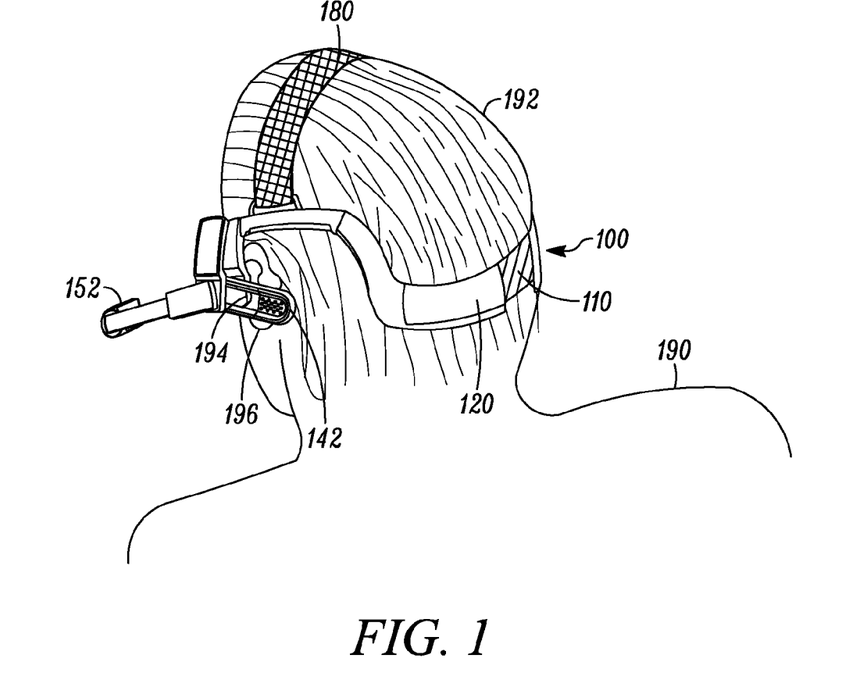
FIG. 1 is rear perspective view of a person wearing an embodiment of a head-mounted display assembly.

FIG. 1 illustrates an embodiment of a head-mounted display assembly 100 worn by a user 190. The display assembly 100 preferably couples to the head 192 of the user 190, appropriately positioning various presentation elements for convenient reception by the user 190. For example, a display device 152 can be positioned for viewing in front of an eye 194 of the user 190. Similarly, an audio device 142 can be positioned near an ear 196 to provide audible signals to the user 190. The display assembly 100 can be held to the head 192 with a pivoting member 110 which brings first and second side portions 120, 130 towards the head 192, thereby clamping the display assembly 100 to the user 190. A stabilization or support member 180, such as a strap, can also be used to provide additional contact or to inhibit pressure from the extension portions 222, 232 on the ears 196.

Figure 2:
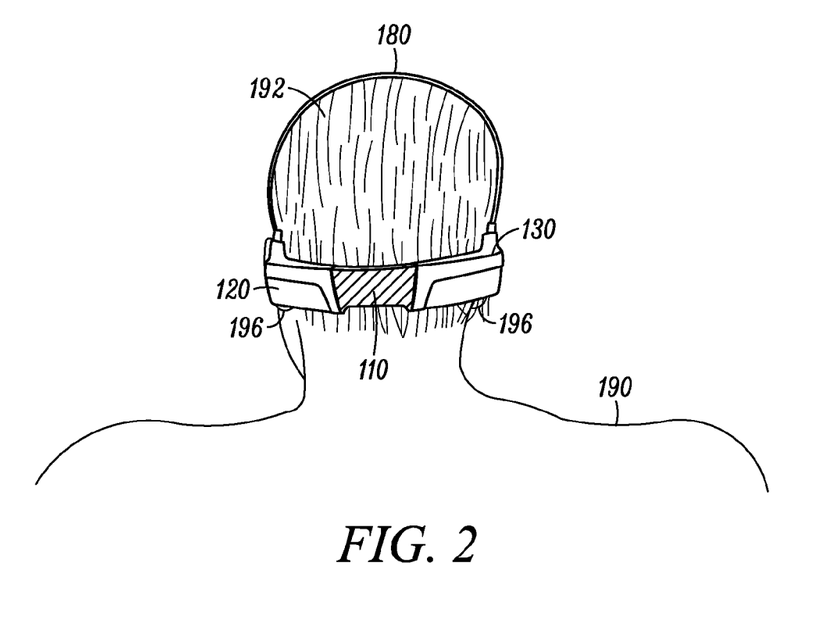
FIG. 2 is a rear view of the person wearing the embodiment of FIG. 1.

With additional reference to FIG. 2, a rear view of the display assembly 100 shows the first and second side portions 120, 130, which are coupled together by the pivoting member 110. The display assembly 100 can have an additional support member 180 across the top of the head 192 during use. The pivoting member 110 preferably pivots around a central portion, such as a hinge, to bring the first and second side portions 120, 130 into tighter contact with the head 192.

FIGS. 3 and 4 illustrate another embodiment of a head-mounted display assembly 200. Unless otherwise indicated, components are substantially similar to those described above, except that the numerical designator has been incremented by 100. Reference is made throughout to such directions as right, left, front or forward, rear or backward, up or upward, and down or downward in context of the directions illustrated, such as the directions shown in FIGS. 3 and 4. As stated above, such reference is made to components within a consistent but arbitrary frame of reference for descriptive purposes and is not intended to limit features of those components to functioning solely in such orientations.

The display assembly 200 can include the first and second side portions 220, 230, the pivoting member 210, extension portions, such as the first extension portion 222, a joint assembly 260 coupled to the first extension portion 222, an audio device 242, a display device 252, as well as other components. The stabilization or support member 280 can be coupled to the display assembly 200 at one or more attachment points 282. The audio device 242 can be coupled to the joint assembly 260 by an audio arm 244. Similarly, a display extension member 250 can couple the display device 252 to the joint assembly 260.

The first and second side portion 220, 230 are components of the display assembly 200 adapted to contact and couple to an object between them. The side portions 220, 230 can have various shapes and sizes, including the substantially quadrilateral prism shapes shown. The side portions 220, 230 can include numerous types of components useful for the display assembly 200, including ports, processing devices such as mobile computing devices, lighting devices or other status indicators, a global positioning system device, wireless antennas, which can be coupled to the processing devices, for use in communicating with remote networks, as well as cellular antennas for use in telephonic operations. The side portions 220, 230 can also include battery devices, memory devices, imaging devices, such as cameras or other sensors, whether digital or analog, as well as tactile components, such as pads, straps, and various contact surfaces to adjust the contact interface of the side portions 220, 230.

The side portions 220, 230, can alternatively be referred to as gripping, contact, or clamping members or portions, as they provide the primary contact surface for the display assembly 200. The side portions 220, 230 can couple to the rear of a user's head, as shown in FIGS. 1 and 2, as well as FIGS. 5-7. In certain embodiments, the side portions 220, 230 can be formed to contact the lower half of the user's head. In some embodiments, the side portions 220, 230 can have a curved inner surface, where the curvature is adapted to provide comfort and/or stability to the user when wearing the display assembly 200. The side portions 220, 230 can have detachable components, such as a removable inner liner or strap, which can be replaced as desired. Whether through the use of a liner or direct texturing, the inner surface of the side portions 220, 230 can have features aiding in retaining the position of the display assembly 200, such as sticky, tacky, or relatively high frictional surfaces.

Figure 5:
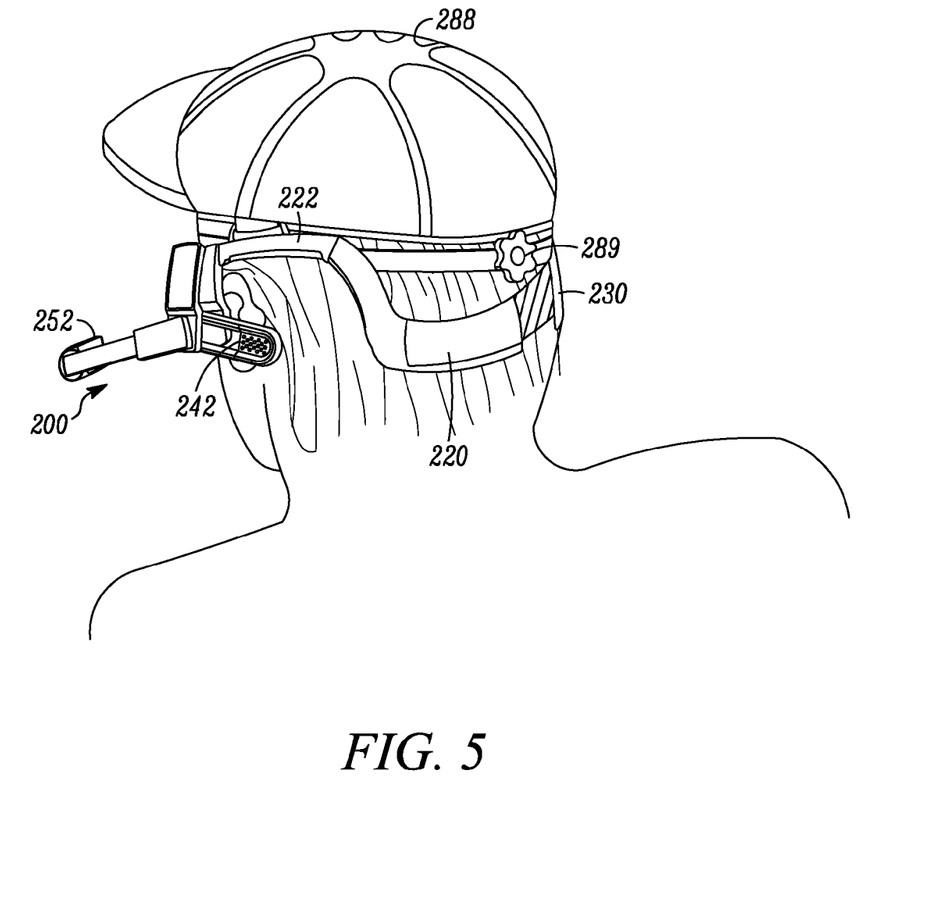
FIG. 5 is a rear perspective view of the display assembly embodiment of FIG. 3 worn by a person wearing safety headwear.

The side portions 220, 230 can be shaped to avoid interaction with other equipment the user may wear. For example, the side portions 220, 230 can be positioned downward relative to the extension portions 222, 232 to extend around the back of the user's head that the user can wear a hard hat, or other safety headwear. FIG. 5 illustrates an exemplary embodiment of the display assembly 200 worn by a user with a hard hat 288. Certain headwear can include an adjustment device 289 positioned at the rear of the head as well. The side portions 220, 230 and pivoting member 210 can be shaped or positioned to reside low enough on the head to avoid contacting the adjustment device 289. Thus, the display assembly 200 can extend around the rear of the user's head below the bottom of a rear portion of the hard hat, safety hat, or other headwear. Such shape modifications can include recesses, notches, or curvature to avoid overlying the surface of the user's head where the adjustment device resides.

The pivoting member 210 can couple the side portions 220, 230 to each other, as well as provide the clamping or squeezing force used to maintain the position of the side portions 220, 230. In some embodiments, the pivoting member 210 can also bias the side portions 220, 230 inward toward each other. The pivoting member 210 can be any device or assembly which can provide a pivot point between the side portions 220, 230. Thus, the pivoting member 210 can be a hinge or hinge assembly, a ball-and-socket assembly, a flexible solid member, or any other pivoting device or assembly. Accordingly, the pivoting member 210 can have one or more springs, joints, flexible members, or other components appropriate to perform the described functions.

The pivoting member 210 can have sufficient stiffness to remain in a position once manipulated to that position. Thus, a user can manipulate the display assembly 200 to couple to the rear of her head by clamping the side portions 220, 230 thereto. The pivoting member 210 can have sufficient stiffness to remain clamped in a particular position until manipulated to a new position. The clamping force can be sufficient to support the weight of the display assembly 200, allowing it to couple to objects, such as a user's head, from the side. The clamping force provided by the pivoting member 210 can vary depending on the embodiment. For example, some pivoting members can provide only a single pound or less of clamping force, while others can provide more, such as eight, ten, twelve pounds of clamping force, or more. In certain embodiments, the amount of stiffness and/or biasing force the pivoting member 210 provides can be adjusted, such as by twisting a knob or any other desired technique.

The pivoting member 210 can be enclosed or surrounded by material, such as a coating or housing, so long as it is capable of the functions described herein. The pivoting member 210 can be positioned at the rearmost point of the display assembly 200, either in the middle as viewed from left to right, as shown, or offset to either side. In those embodiments with an offset pivoting member 210, the first and second side portions 220, 230 can be of different sizes to accommodate the position of the pivoting member 210.

Each side portion 220, 230 can have a respective first and second extension portion 222, 232. The first and second extension portions 222, 232 can project forward from the respective side portion 220, 230. The first and second extension portions 222, 232 can extend forward at a level higher, or further up, than the level of the first and second side portions 220, 230. The extension portions 222, 232 can have features which aid comfort during wearing, such as a contoured inner surface, and/or an liner, such as a rubber strip along surfaces contacting the user's head. Such features can be removable and/or replaceable.

The first and second extension portions 222, 232 can couple to additional components, as desired for the embodiments. The first extension portion 222 is exemplary of components of a display assembly which can be coupled to a side portion by an extension portion. As can be seen in the side view of FIG. 4, the first extension portion 222 can be coupled to a joint assembly 260. Preferably, the first and second extension portions 222, 232 do not inhibit similar mounting of eyewear, safety eyewear, such as safety glasses or face shields, and so on, near the ears of the user. Accordingly, the first and second extension portions 222, 232 need not contact or rest against the ears of the user. They can instead contact the user's head above the ear, permitting other devices, including eyewear and safety eyewear to support themselves on the user's ears without interference from the display assembly 200. The support member 280 can assist in positioning the first and second extension portions 222, 232 in a location to avoid contacting the ears and/or eyewear of the user. Accordingly, the support member 280 can be adjustable as desired by the user, such as by shortening or lengthening it.

The joint assembly 260 can include various rotating and flexible members, such as hinges, ball-and-socket joints, elbow and shoulder joint assemblies, and so on, which couple to other components. For example, the audio device 242 is coupled to the joint assembly 260 by the audio arm 244. The audio arm 244 can be rotatable around a pivot point coupled to the joint assembly 260 in certain embodiments. In some embodiments, the audio arm 244 can be a flexible member, with any desired stiffness, to permit additional adjustability. Thus, the audio device 242 can be positioned any desired location within the adjustment range of the audio arm 244.

Similarly, the display extension member 250 can be coupled to the joint assembly 260 using one or more hinge or joint devices. The display extension member 250 can be free to rotate, pivot, or otherwise have its position adjusted to any desired location, resulting in adjustable placement of the display device 252 in a viewable location and orientation. In certain embodiments, the display device 252 can also have positioning devices, such as joints, pivots, and hinges, which permit it to be positioned independently to the positioning of the display extension member 250 from the joint assembly 260.

The audio device 242 can be any device or system capable or producing audio signals. For example, the audio device 242 can be a speaker. In certain embodiments, the audio device 242 can be coupled to at least one of the side portions 220, 230.

Similarly, the display device 252 can be any optical display or device capable of producing a visual signal, such as a light-emitting source, including light-emitting diodes, as well as complex display devices, including miniature graphical screens, such as liquid crystal display (LCD) screens and organic light-emitting diode (OLED) screens. In the embodiment illustrated in FIG. 3, a screen 254 is shown facing inward. In other embodiments, simple graphical devices, such as lights, can also be used. Although illustrated as a solid device, the display device 252 can, in certain embodiments, have one or more transparent elements, including a transparent screen 254, onto which visual signals can be produced overlying background images the user observes through the transparent screen 254. Certain embodiments of the display device 252 can have optical features, such as magnifying lenses, which adjust the image from the screen 254 as seen by the user, or safety features, such as a rim or flange. In some embodiments, the display device 252 can receive as well as present information, such as a retinal scanning device.

It should be understood that the display assembly 200 is not limited to merely supporting and positioning a display device, such as the display device 252. Rather, any appropriate component, such as a camera, solely audio device, such as a microphone or speaker, or any other interaction device can be mounted using the features of the display assembly 200. Thus, the display assembly 200 can be adapted to support one, or a combination, or such devices while embodying other features, such as the pivoting member 210 and first and second side portions 220, 230.

The display extension member 250 can be a single, solid device, such as a flexible arm, or it can be multiple segments jointedly or hingedly coupled together and to the joint assembly 260. Thus, the display extension member 250 can be bent or angled by the user to assist in desirable and/or comfortable positioning of the display device 252. In addition to the display device 252, one or more microphones 256 or other audible sensor can be positioned at an end of the display extension member 250, as shown. The display extension member 250 can project forward from the joint assembly 260, as well as upwards, as well as being adjustable to any range of motion in between. In certain embodiments, the microphone 256 can be positioned in or coupled to the display extension member 250 in places other than near the display device 252. Moreover, the microphone 256 can be positioned in or near the audio device 242, such as on the audio arm 244, as well as in or on the extension portions 222, 232. In some embodiments, the microphone 256 can be positioned on a portion of the display device 252. Additionally, multiple microphones can be used in certain embodiments, each positioned differently, if desired.

Figure 6:
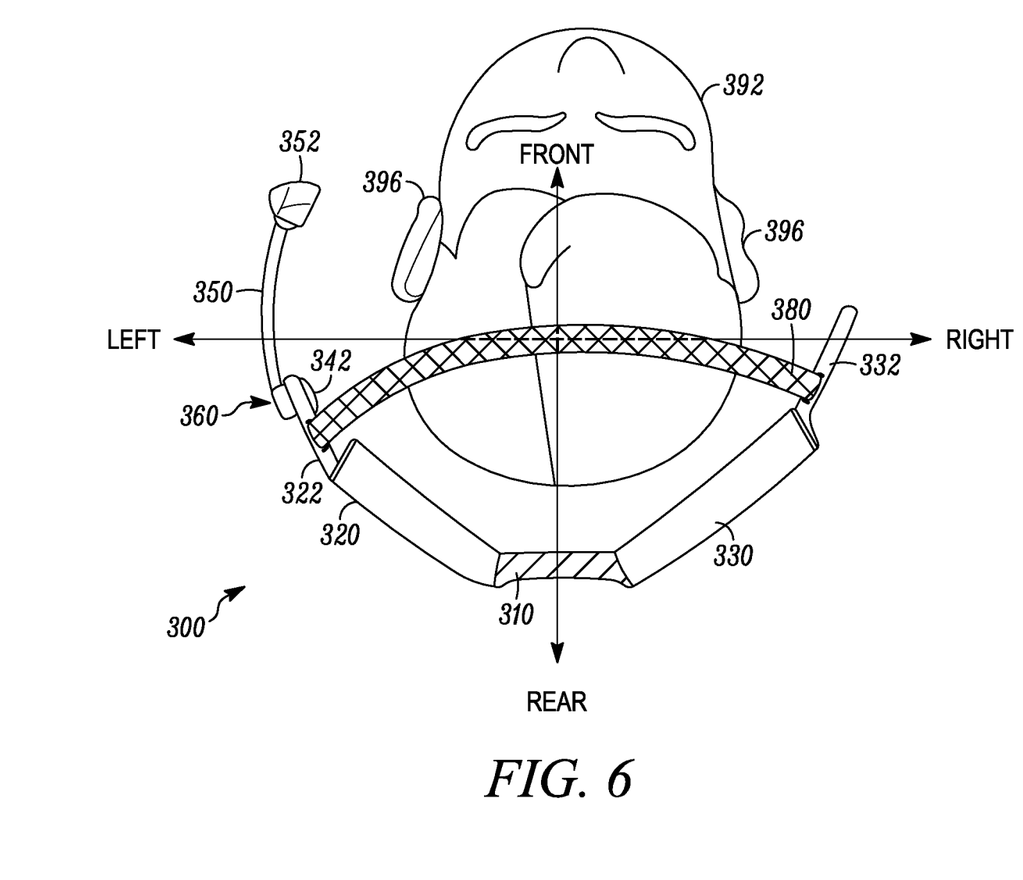
FIG. 6 is a top view of another embodiment of a head-mounted display assembly in a first position adjacent a user's head.

The support member 280 can be a strap, as well as any device or member which extends between the first and second side portions 220, 230. The support member 280 can extend upward in an arch, as shown, or can have a different shape. The support member 280 can be adjusted to adjust the position of the display assembly 200, in cooperation with manipulation of the pivoting member 210. In certain embodiments, the support member 280 can be omitted entirely. The support member 280 can be a flexible and/or extendable item, such as an elastic or nylon strap, or an adjustable length of inelastic strap which can be adjusted to fit the head size of the user. In certain embodiments, the support member 280 can comprise multiple discrete segments. The support member 280 can be multiple support members coupled to the side portions 220, 230 pivoting member 210, and/or extension portions 222, 232, as well, resulting in the support members extending in other directions than the right-to-left direction illustrated. The support member 280, whether one or more members, can be thin and flexible enough to reside underneath a hard hat or other safety headwear.

Where necessary, the display assembly 200 can include multiple wires or other connecting mechanisms for interconnecting components. For example, in those embodiments where the display assembly 200 includes a mobile computing device comprising or coupled to a side portion, the mobile computing device can operate the audio device 242 to produce sounds. The side portion 220 can be coupled to the audio device 242 using a wire, if desired. Similarly, for example, the display device 252 can be connected to the first side portion 220 by a wire extending backward from the audio device 242 along the display extension member 250, through the joint assembly 260, and along the first extension portion 222. In other embodiments, including those without computing devices, wires can be used to connect the display device 252 to one or more ports in a side portion 220, 230, permitting the display device 252 to present information from an external processing device. In some embodiments, such an external processing device can couple to the components of the display assembly 200, such as the display device 252, audio device 242, and so on. Features described above can be performed by, or coupled to, either side portion 220, 230, as desired for the embodiment FIG. 6 illustrates another embodiment of a display assembly 300. The display assembly 300 is shown in a first position near a user's head 392. Unless otherwise mentioned, the numerical indicators used refer to those components described above with respect to FIGS. 1 and 2, and FIGS. 3 and 4, except that the number of the designator has been incremented by 200 and 100, respectively.

Figure 7:
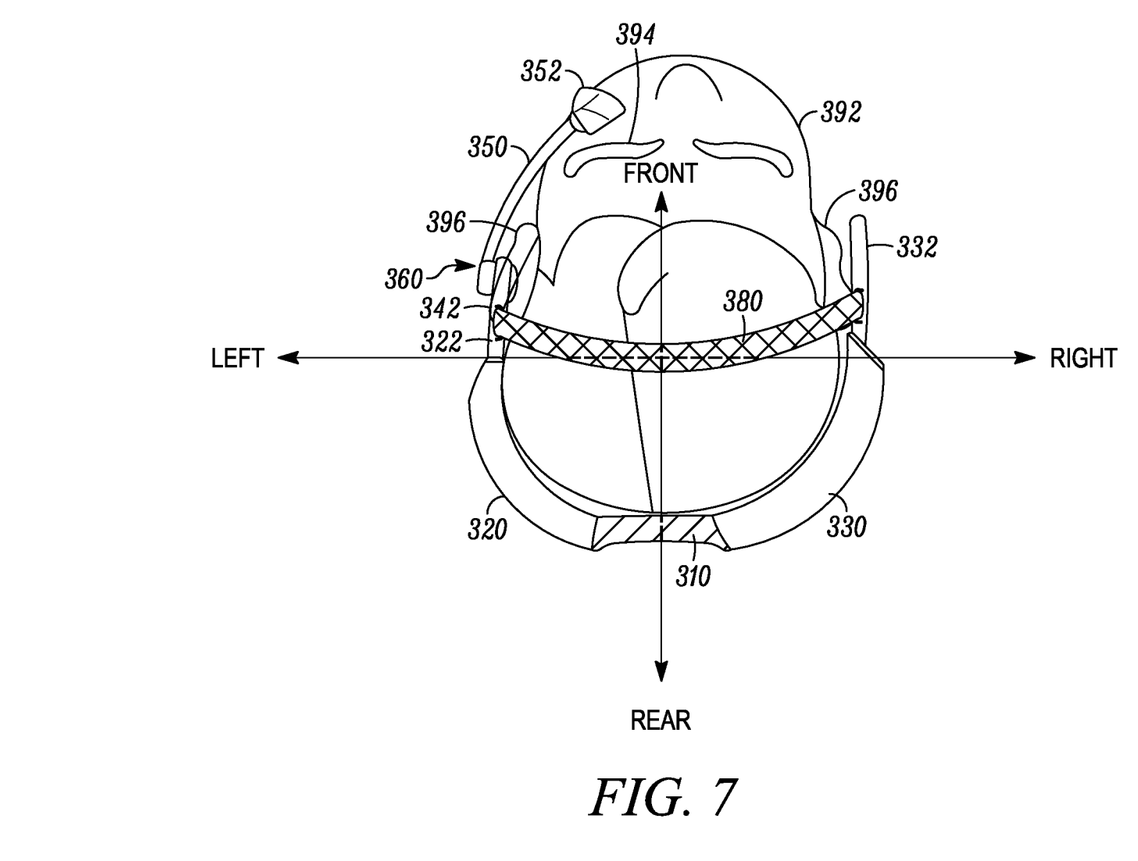
FIG. 7 is a top view of the embodiment of FIG. 5 in a second position coupled to the user's head.

The display assembly 300 is shown in a position from which it can be coupled to the user's head 392. FIG. 7 illustrates the display assembly 300 coupled to the user's head 392. The user can position the display assembly 300 behind his head 392, with the display device 352 projected forward and the support member 380 positioned at a desired place across the head 392. The gripping or side portions 320, 330 can then be pressed inward 392, and rotated about the pivoting member 310 until the display device 352 is positioned as desired. The display assembly 300 can retain its position against the user's head by the inward squeezing or clamping force from the pivoting member 310 as well as additional support from the support member 380. Additionally, the first and second extension portions 322, 332 can extend forward above the user's ear, optionally resting thereon. The user 390 can then adjust the audio arm 344 to position the audio device 342 to a desired location adjacent or against the ear 396. Similarly, the joint assembly 360 and display extension member 350 can be adjusted to position the display device 352 at a desired position for observation by the user's eye 394.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A clamping apparatus for a head-mounted display device, the clamping apparatus comprising:
    a pivot portion comprising a continuous surface having a first end, a second end, and a pivot point at a rear of the clamping apparatus, the pivot portion configured to rotate around the pivot point in a vertical plane;
    a first side portion coupled to the first end of the continuous surface of the pivot portion and extending in a forward direction from the pivot portion;
    a second side portion coupled to the second end of the continuous surface of the pivot portion and extending in the forward direction from the pivot portion, wherein the pivot portion is configured to rotate the first and second side portions relative to each other around the pivot point through the vertical plane to provide a clamping force to adjust a position of the first side portion and the second side portion from a first position to a second position, and wherein the pivot portion has a predetermined stiffness to retain the first and second side portions in the first portion and in the second position; and a display device assembly coupled to the first side portion, the display device assembly extending in the forward direction from the first side portion.

2. The clamping apparatus of claim 1, wherein the display device assembly comprises a forward projection member and an optical display, the forward projection member coupling the optical display to the first side portion.

3. The clamping apparatus of claim 2, wherein the forward projection member is configured to adjust a position of the optical display relative to the first side portion.

4. The clamping apparatus of claim 3, wherein at least one of the first and second side portions comprises a processing device configured to control the optical display to produce a visual image.

5. The clamping apparatus of claim 1, further wherein a support member is coupled to the first side portion and the second side portion such that the support member is positioned across a top of a head of a user wearing the head mounted display, and the support member comprises a stabilization strap coupled to the first and second side portions.

6. The clamping apparatus of claim 1, wherein the pivot portion comprises a hinge member configured to rest at a rear of a user's head and the first and second side portions are adapted to contact the rear of the user's head.

7. The clamping apparatus of claim 1, wherein the first side portion comprises a forward extension member configured to extend forward from the first side portion and to extend above an ear of a user.

8. The clamping apparatus of claim 7, wherein the first side portion further comprises an audio device coupled to the forward extension member, the audio device configured to be positioned adjacent to the ear of the user.

9. A hand mounted wearable computing apparatus comprising:

a hinge member comprising a continuous surface having a first end, a second end, and a pivot point;

a first gripping member coupled to the first end of the continuous surface of the hinge member and extending forward from the hinge member, and comprising a processing device;

a second gripping member coupled to the second end of the continuous surface of the hinge member and extending forward from the hinge member, the hinge member configured to rotate the first and second gripping members relative to each other around the pivot point through a vertical plane to provide a clamping force to adjust a position of the first gripping member and the second gripping member from a first position to a second position and, the hinge member having a predetermined stiffness to retain the first gripping member and the second gripping member in the first position and in the second position.

10. The head mounted wearable computing apparatus of claim 9, wherein the clamping force is about eight pounds.

11. The head mounted wearable computing apparatus of claim 9, wherein a support member is coupled to the first gripping member and the second gripping member such that the support member is positioned across a top of a head of a user wearing the head mounted wearable computing apparatus, and the support member comprises a support strap coupled to the first and second gripping members.

12. The head mounted wearable computing apparatus of claim 9, further comprising a wireless antenna coupled to the processing device.

13. The head mounted wearable computing apparatus of claim 9, further comprising a display assembly, the display assembly comprising:

a positioning member coupled to the first gripping member and extending forward from the first gripping member; and a display device coupled to the positioning member, the display device adapted to display a visual image to a user.

14. The head mounted wearable computing apparatus of claim 13, wherein the positioning member comprises a flexible member adapted to adjust a position of the display device relative to the first gripping member.

15. The head mounted wearable computing apparatus of claim 9, wherein the first gripping member comprises a high-friction surface.

16. The head mounted wearable computing apparatus of claim 9, wherein the wearable computing apparatus is configured to rest against a user's head below a rear portion of a safety hat worn on the user's head.

17. A head-mounting apparatus comprising:

a first side portion having a first front end and a first rear end, the first front end positioned in a forward direction from the first rear end;

a second side portion having a second front end and a second rear end, the second front end positioned in the forward direction from the second rear end; and a pivot member comprising a continuous surface including a pivot point having a nominal stiffness, the pivot member coupled to the first rear end and the second rear end and configured to provide a clamping force for adjusting a position of the first side portion and the second side portion by rotating the first side portion and the second side portion relative to each other around the pivot point about a vertical axis to adjust a position of the first side portion and the second side portion from a first position to a second position, and wherein the pivot member has a predetermined stiffness to retain the first side portion and the second side portion in the first position and in the second position.

18. The head-mounted display apparatus of claim 17, wherein a support member is coupled to the first side portion and second side portion such that the support member is positioned across a top of a head of a user wearing the head mounted apparatus, and wherein the support member comprises a support strap coupled to the first and second side portions.

19. The head-mounted display apparatus of claim 17, further comprising a display screen coupled to the first front.

* * * * *